US011049511B1

(12) United States Patent
Seethaler et al.

(10) Patent No.: US 11,049,511 B1
(45) Date of Patent: Jun. 29, 2021

(54) SYSTEMS AND METHODS TO DETERMINE WHETHER TO UNMUTE MICROPHONE BASED ON CAMERA INPUT

(71) Applicant: Lenovo (Singapore) Pte. Ltd., Singapore (SG)

(72) Inventors: Kenneth Seethaler, Raleigh, NC (US); Adam Jerome Cavenaugh, Cary, NC (US); Kazuo Fujii, Tokyo (JP); Koji Kawakita, Yokohoma (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/727,836

(22) Filed: Dec. 26, 2019

(51) Int. Cl.
*G10L 25/78* (2013.01)
*H04R 29/00* (2006.01)
*H04N 7/15* (2006.01)
*G10L 15/25* (2013.01)

(52) U.S. Cl.
CPC ............. *G10L 25/78* (2013.01); *G10L 15/25* (2013.01); *H04N 7/15* (2013.01); *H04R 29/004* (2013.01)

(58) Field of Classification Search
CPC ....... G06K 9/00302; G06T 7/20; G10L 15/25; G10L 25/78; G10L 15/22; H04L 65/4015; H04L 67/02; H04L 65/1083; H04N 7/15; H04R 3/007; H04R 29/004; H04R 1/08; G06F 3/165; H04M 1/6008
USPC ...... 340/573.1; 348/14.07, 14.08; 379/32.01, 379/202.01, 421; 704/210; 455/406; 715/758
See application file for complete search history.

(56) References Cited

U.S. PATENT DOCUMENTS

| 8,639,214 B1* | 1/2014 | Fujisaki ............... H04M 11/007 455/406 |
| 9,071,692 B2* | 6/2015 | Sanaullah ............. H04M 3/563 |
| 9,940,944 B2* | 4/2018 | Finlow-Bates ....... H04M 1/656 |
| 9,967,520 B1* | 5/2018 | Rensburg ............ H04L 12/1822 |
| 10,652,679 B1* | 5/2020 | Boss ..................... H04L 65/602 |
| 2010/0034366 A1* | 2/2010 | Basson ................... H04M 3/56 379/202.01 |
| 2010/0080382 A1* | 4/2010 | Dresher ............. H04M 1/6033 379/421 |
| 2010/0322387 A1* | 12/2010 | Cutler ................ H04M 3/2236 379/32.01 |
| 2010/0324891 A1* | 12/2010 | Cutler ..................... G10L 25/78 704/210 |

(Continued)

OTHER PUBLICATIONS

"Feature Extraction", Wikipedia, retrieved on Jul. 16, 2020 from https://en.wikipedia.org/wiki/Feature_extraction.

(Continued)

*Primary Examiner* — Gerald Gauthier
(74) *Attorney, Agent, or Firm* — John M. Rogitz; John L. Rogitz

(57) ABSTRACT

In one aspect, a device includes at least one processor and storage accessible to the at least one processor. The storage includes instructions that may be executable by the at least one processor to receive input from a camera in communication with the at least one processor and to determine, based on the input from the camera, whether a user is currently speaking. The instructions may also be executable to present a notification regarding whether to unmute at least one microphone accessible to the at least one processor responsive to a determination that the user is currently speaking.

20 Claims, 9 Drawing Sheets

(56) References Cited

U.S. PATENT DOCUMENTS

| | | | | |
|---|---|---|---|---|
| 2012/0026279 A1* | 2/2012 | Kato | ........................ | H04N 7/15 |
| | | | | 348/14.08 |
| 2013/0321156 A1* | 12/2013 | Liu | ..................... | H04M 1/6008 |
| | | | | 340/573.1 |
| 2014/0229866 A1* | 8/2014 | Gottlieb | .............. | H04L 12/1822 |
| | | | | 715/758 |
| 2015/0002611 A1* | 1/2015 | Thapliyal | .................. | H04N 7/15 |
| | | | | 348/14.08 |
| 2015/0085064 A1* | 3/2015 | Sanaullah | ................ | G06F 3/165 |
| | | | | 348/14.08 |
| 2015/0156598 A1* | 6/2015 | Sun | .......................... | H04N 7/15 |
| | | | | 348/14.07 |
| 2017/0006395 A1* | 1/2017 | Loo | .......................... | H04R 1/04 |
| 2017/0171286 A1* | 6/2017 | Coste | .................... | H04L 65/403 |
| 2018/0358034 A1* | 12/2018 | Chakra | .................... | G10L 25/78 |
| 2019/0014410 A1* | 1/2019 | Krishnamoorthy | .... | H04R 29/00 |
| 2019/0075382 A1* | 3/2019 | Schrader | ............. | H04M 1/6058 |
| 2020/0110572 A1* | 4/2020 | Lenke | ...................... | H04N 7/15 |
| 2020/0285443 A1* | 9/2020 | Yuan | ........................ | G06F 3/167 |

OTHER PUBLICATIONS

Li et al., "Headset Boom With Infrared Lamp(s) and/or Sensor(s)", file history of related U.S. Appl. No. 16/993,794, filed Aug. 14, 2020. (RPS920200052-US-NP-1201-374).

* cited by examiner

US 11,049,511 B1

SYSTEMS AND METHODS TO DETERMINE WHETHER TO UNMUTE MICROPHONE BASED ON CAMERA INPUT

FIELD

The present application relates to technically inventive, non-routine solutions that are necessarily rooted in computer technology and that produce concrete technical improvements.

BACKGROUND

As recognized herein, sometimes a person might be participating in a video conference and begin speaking without recognizing that his or her microphone is currently muted, resulting in the inability of other video conference participants to hear that person despite seeing him or her. This in turn leads to data loss and missed information. There are currently no adequate solutions to the foregoing computer-related, technological problem.

SUMMARY

Accordingly, in one aspect a first device includes at least one processor and storage accessible to the at least one processor. The storage includes instructions executable by the at least one processor to receive input from a camera in communication with the at least one processor and to determine, based on the input from the camera, whether a user is currently speaking. The instructions are also executable to present a notification regarding whether to unmute at least one microphone accessible to the at least one processor responsive to a determination that the user is currently speaking.

In some examples, the first device may include both the camera and the at least one microphone. Also in some examples, the instructions may be executable to execute a computer vision algorithm to determine whether the user is currently speaking Still further, the first device may include a display accessible to the at least one processor, and in these examples the instructions may be executable to present the notification on the display Furthermore, in some implementations the instructions may be executable to present the notification on the display as part of a graphical user interface (GUI) responsive to the determination that the user is currently speaking, where the GUI may include a selector that is selectable to unmute the at least one microphone.

Additionally or alternatively, the first device may include at least one speaker accessible to the at least one processor, and the instructions may be executable to present the notification audibly using the at least one speaker.

Still further, in some implementations the instructions may be executable to, prior to presentation of the notification, determine whether the at least one microphone is currently muted. Thus, in these implementations the instructions may be executable to present the notification responsive to both the determination that the user is currently speaking and a determination that the at least one microphone is currently muted. For example, the instructions may be executable to facilitate a video conference with a second device different from the first device using a first video conferencing application, and thus the instructions may be executable to determine whether the at least one microphone is currently muted via the first video conferencing application. If desired, the instructions may be further executable to, based on a determination that the at least one microphone is not currently muted via the first video conferencing application, determine whether the at least one microphone is currently muted via an operating system executing at the first device and/or hardware accessible to the first device. The hardware may include a switch or button that is manipulable to mute and unmute the at least one microphone.

Also in some implementations, the instructions may be executable to receive first user input to unmute the at least one microphone subsequent to presentation of the notification and, responsive to receipt of the first user input, unmute the at least one microphone and transmit data to a second device. The data may indicate second user input to the at least one microphone that may include audible input.

In another aspect, a method includes receiving input from a camera and determining, based on the input from the camera, whether a user is currently speaking. The method also includes, responsive to determining that the user is currently speaking, issuing a command to present a notification regarding whether to unmute at least one microphone accessible to a first device.

In some implementations, the method may be performed by a server in communication with the first device, and the command may be issued by transmitting the command to the first device. Also in some implementations, the method may be performed by an end-user device that establishes the first device, and the command may be issued by controlling an electronic display accessible to the end-user device to present the notification.

The notification itself may be presented on a display accessible to the first device as part of a graphical user interface (GUI), where the GUI may include a selector that is selectable to unmute the at least one microphone.

Still further, in some examples the method may include determining whether the at least one microphone is currently muted prior to issuing the command, and then issuing the command responsive to both determining that the user is currently speaking and determining that the at least one microphone is currently muted.

In another aspect, at least one computer readable storage medium (CRSM) that is not a transitory signal includes instructions executable by at least one processor to receive input from a camera in communication with the at least one processor and to determine, based on the input from the camera, that a user is speaking. The instructions are also executable to, based on the determination that the user is speaking, present a graphical user interface (GUI) on a display accessible to the at least one processor. The GUI includes an indication that at least one microphone accessible to the at least one processor is in a mute mode. In some examples, the GUI may also include a selector that is selectable to take the at least one microphone out of the mute mode.

The details of present principles, both as to their structure and operation, can best be understood in reference to the accompanying drawings, in which like reference numerals refer to like parts, and in which:

DETAILED DESCRIPTION

Figure 1:
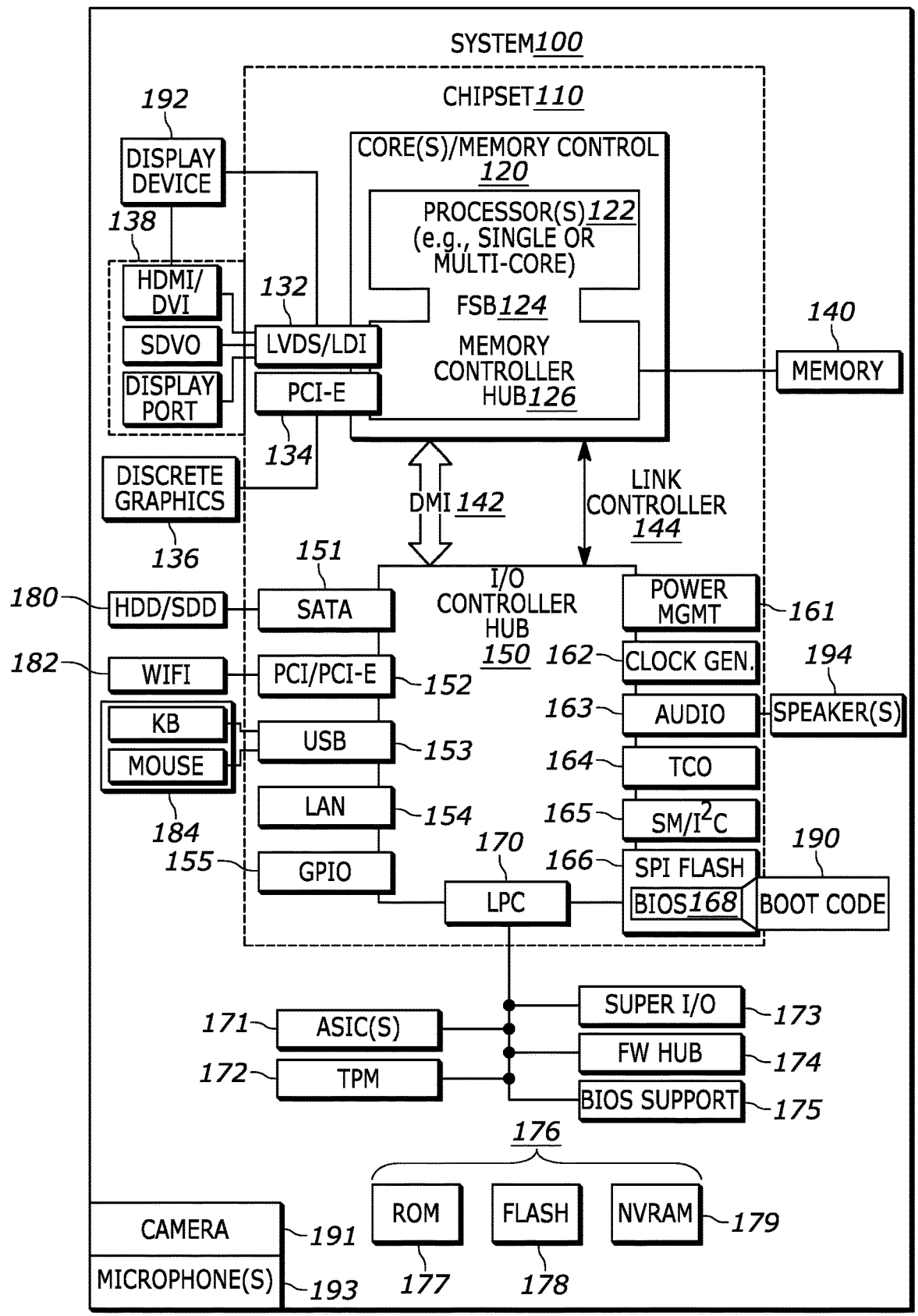
FIG. 1 is a block diagram of an example system consistent with present principles.

Among other things, the present application discloses systems and methods to use computer vision and artificial intelligence (AI) during video conferencing to detect if a user in front of a device's camera appears to be speaking by detecting specific movements of the mouth. When the AI detects the user is speaking, the system and application mute settings may be accessed by the device to verify whether the microphone is set to "off mute". If any of the settings are set to microphone mute being on, the user may then be notified that his or her microphone or device is set to audio input mute. The user may then determine if he or she wants to go off mute at that point, and/or the device may automatically set itself to go off mute.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include at least one microphone or a microphone array 193 that may provide input from the microphone/array 193 to the processor 122 based on audio that is detected, such as via a user providing audible input to the microphone/array 193 consistent with present principles. The system 100 may also include at least one camera 191 that may gather one or more images and provide the images to the processor 122. The camera 191 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Still further, though not shown for simplicity in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
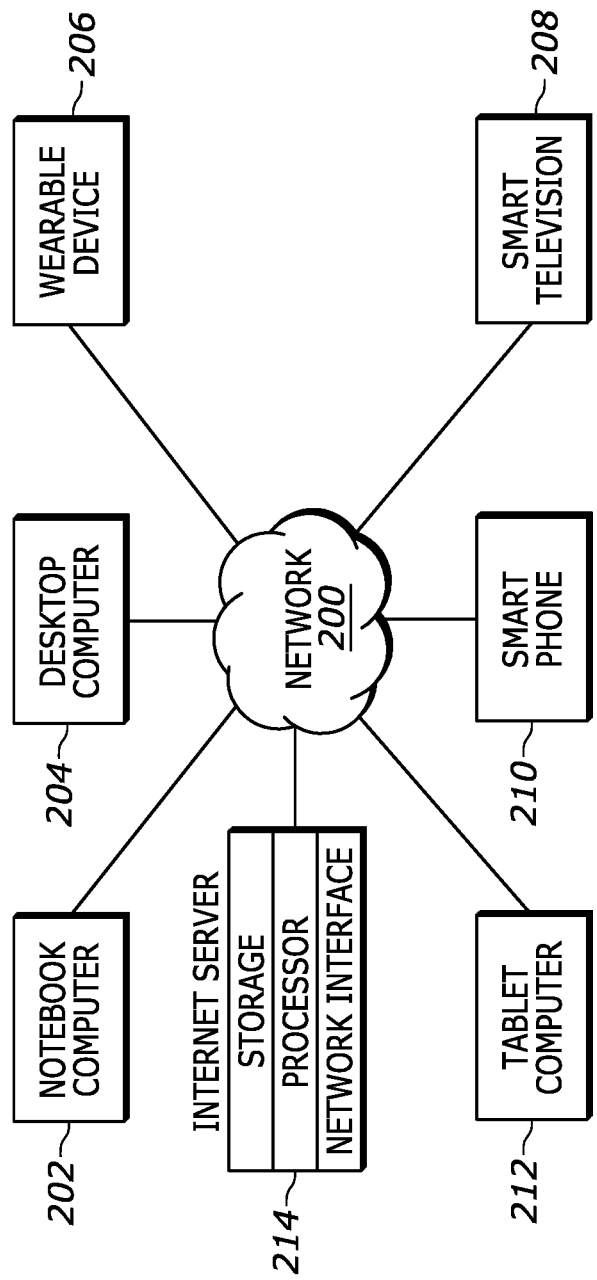
FIG. 2 is a block diagram of an example network of devices consistent with present principles.

Turning now to FIG. 2, example devices are shown communicating over a network 200 such as the Internet in accordance with present principles, e.g., for video conferencing as described herein. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
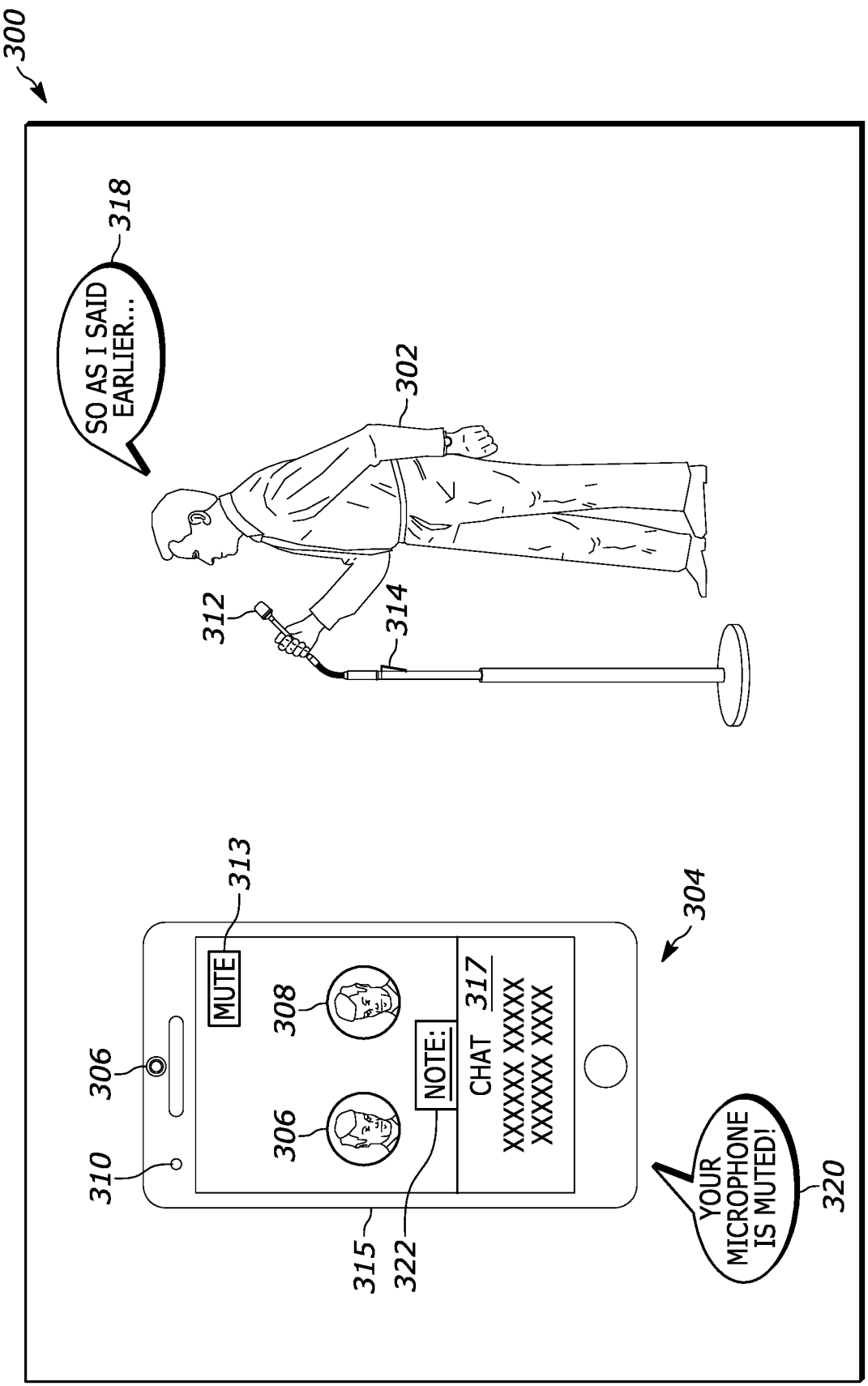
FIGS. 3, 10, and 11 show example illustrations consistent with present principles.

Now describing FIG. 3, it shows an example illustration 300 consistent with present principles. Specifically, the illustration 300 depicts a user 302 participating in a video conference that is facilitated through an end-user device 304 such as a laptop computer, desktop computer, tablet computer, smart phone, etc. The device 304 may facilitate the video conference by executing a video conferencing application locally at the device 304, with other devices of other remote participants 306, 308 also executing their own respective copies of the same video conferencing application or another video conferencing application that otherwise may interface with the application executing at the device 304. The video conferencing application may be, for example Skype, Apple's Facetime, a Google Gchat video conference, etc.

The device 304 may have a built-in microphone 310 for receiving audible input from the user 302 to then transmit that input to the other respective devices for the remote participants 306, 308. However, the device 304 may also communicate with additional hardware such as a wireless, stand-alone microphone 312 that the user might be using to provide audible input that the device 304 may then transmit to the other devices. In some examples, the microphone 312 may include a hardware switch or depressable button 314 that may be manipulable between on and off positions to respectively mute and unmute the microphone 312 so that, when muted, the microphone 312 does not transmit audible input it detects to the device 304 while the microphone 312 still remains powered on, or does not receive the audible input altogether (e.g., is turned off). Then when unmuted, the microphone 312 may receive and transmit audible input to the device 304 via Bluetooth or another communication protocol, and the device 304 may then relay the audible input to the respective devices of the other participants 306, 308 in an Internet data stream as part of the video conference.

Additionally, a mute selector 313 presented on a touch-enabled display 315 of the device 304 may also be selected and deselected with touch input to respectively mute and unmute the microphone 310 via the video conferencing application itself. For example, the software mute through the video conferencing application may involve the device 304 receiving audible input via one of the microphones 310, 312 and possibly buffering/caching a threshold most-recent amount of the audible input in random-access memory (RAM) of the device 304, but not actually transmitting any voice data corresponding to the audible input to the respective devices of the other participants 306, 308. The threshold most-recent amount may be, for example, a most-recent thirty seconds.

Also note that a camera 316 is shown as being disposed on the device 304. The camera 316 may gather images of the scene within its field of view, which in this case includes the face of the user 302. The camera 316 may then relay those images to the respective devices of the other participants 306, 308 in an Internet data stream as part of the video conference. Also note that a chat box is shown so that the user 302 and other participants 306, 308 may engage in text/instant message exchange as part of the video conference.

As depicted in FIG. 3, when the user 302 begins speaking as illustrated by speech bubble 318, the device and/or a server in communication with the device may determine that the user 302 is currently speaking by using input from the camera 316. Based on that determination, a command may be issued by the server and/or the local processor on the device 304 (e.g., a central processing unit (CPU)) to present one or more notifications indicating that whatever microphone(s) is being used for the video conference (the microphones 310 and/or 312) is currently muted/in mute mode.

For example, an audible notification 320 may be presented via a speaker on the device that says, "Your microphone is muted!" As another example, a visual notification 322 may be presented on the display 315 as shown so that the notification 322 is presented over top of other visual portions of the video conference, though in some examples the notification 322 may be presented to take up the full display space rather than a portion thereof.

Figure 4:
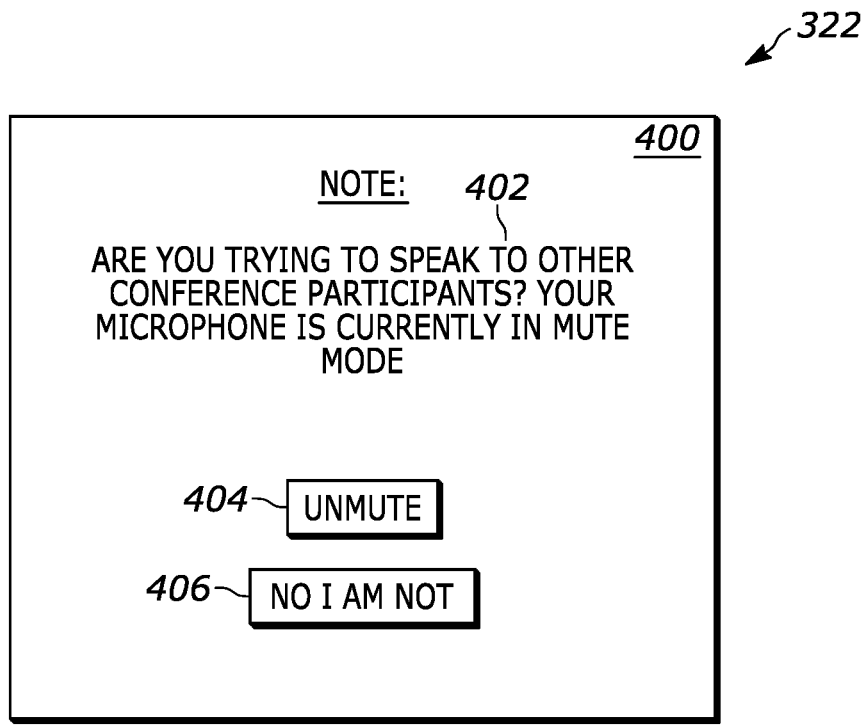
FIGS. 4 and 5 show example graphical user interfaces (GUIs) that may be presented based on determining that a user is speaking consistent with present principles.

The visual notification 322 is shown in more detail in FIG. 4. As shown, the notification 322 may be presented as part of a graphical user interface (GUI) 400 presented on the touch-enabled display of the device 304. As also shown, the GUI 400 may include text 402 indicating that the device has determined that the user is currently speaking but that the microphone being used for video conferencing is currently in a mute mode/muted. For example, the text 402 may indicate the following: "Are you trying to speak to other conference participants? Your microphone is currently in mute mode."

As also shown, the GUI 400 may include a selector 404 that may be selectable to command the device 304 to take the microphone off of mute mode and/or otherwise unmute the microphone at the application level, operating system level, etc. In some examples, the GUI 400 may even include a selector 406 that may be selectable to provide input indicating that the user 302 is not trying to speak to conference participants, with the input then being used to train an artificial neural network using machine learning to make improved determinations of the user speaking to conference participants in the future.

Note that responsive to the selector 404 being selected, in some examples the device 304 may begin streaming or otherwise transmitting, to the devices of the other conference participants, the user's audible input from that point forward as the user provides it to the microphone after selecting the selector 404.

However, in other examples even though the mute mode/ muting may have been turned on prior to selection of the selector 404 so that audible input to the microphone was not transmitted/routed to other conference participants when spoken by the user even with the microphone powered on, the device 304 may have still been caching or storing the audible input during that time. The audible input may have been locally cached in RAM of the device 304, and/or it may even have been streamed to and cached at a remotely-located server that is facilitating communication among the participants' devices for the video conference. Note that in some implementations, only a threshold amount of most-recent input (e.g., the last thirty seconds) may be cached in RAM and/or at the server.

Then, when the user selects the selector 404, the device 304 or server may transmit the cached audible input to the other conference participants' devices. In so doing, the device 304 and/or server may help ensure that although the mute mode was enabled while the cached audible input was spoken, it may still be provided to the other participants at a later time than when spoken rather than simply being lost, which would otherwise result in the user 302 having to re-speak what was already spoken or simply moving on to other speech to the detriment of the other conference participants.

Figure 5:
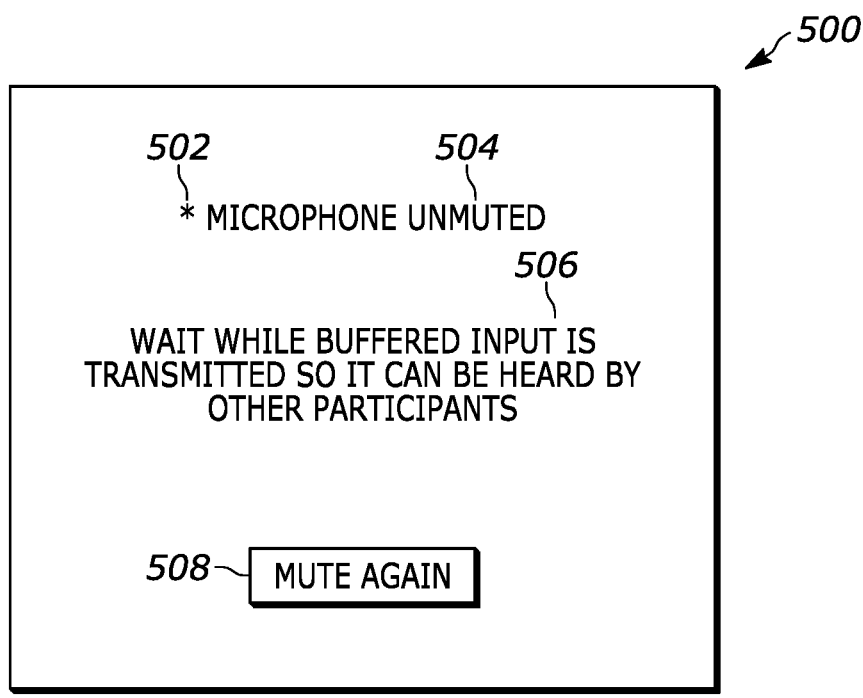

Thus, in situations where cached audible input is to be provided to the other conference participants' devices responsive to selection of the selector 404, the GUI 500 of FIG. 5 may be presented on the touch-enabled display of the device 304. However, also note that the GUI 500 might be presented on the touch-enabled display responsive to automatic microphone unmuting rather than selection of the selector 404, as might have occurred in other example implementations based on the device 304 detecting the user as currently speaking.

In any case, the GUI 500 may include a non-text icon 502 and text 504 indicating that the microphone has been unmuted (or otherwise taken out of mute mode). The GUI 500 may also include text 506 instructing the user to wait before speaking any additional input to the microphone so that previously cached audible input form the user can be transmitted to the other conference participants and heard by them via their own respective devices before the user provides additional audible input. In some examples, the GUI 500 may even include a selector 508 to again mute the microphone or otherwise place it back in mute mode, e.g., after the user is done speaking what he or she had to say.

Figure 6:
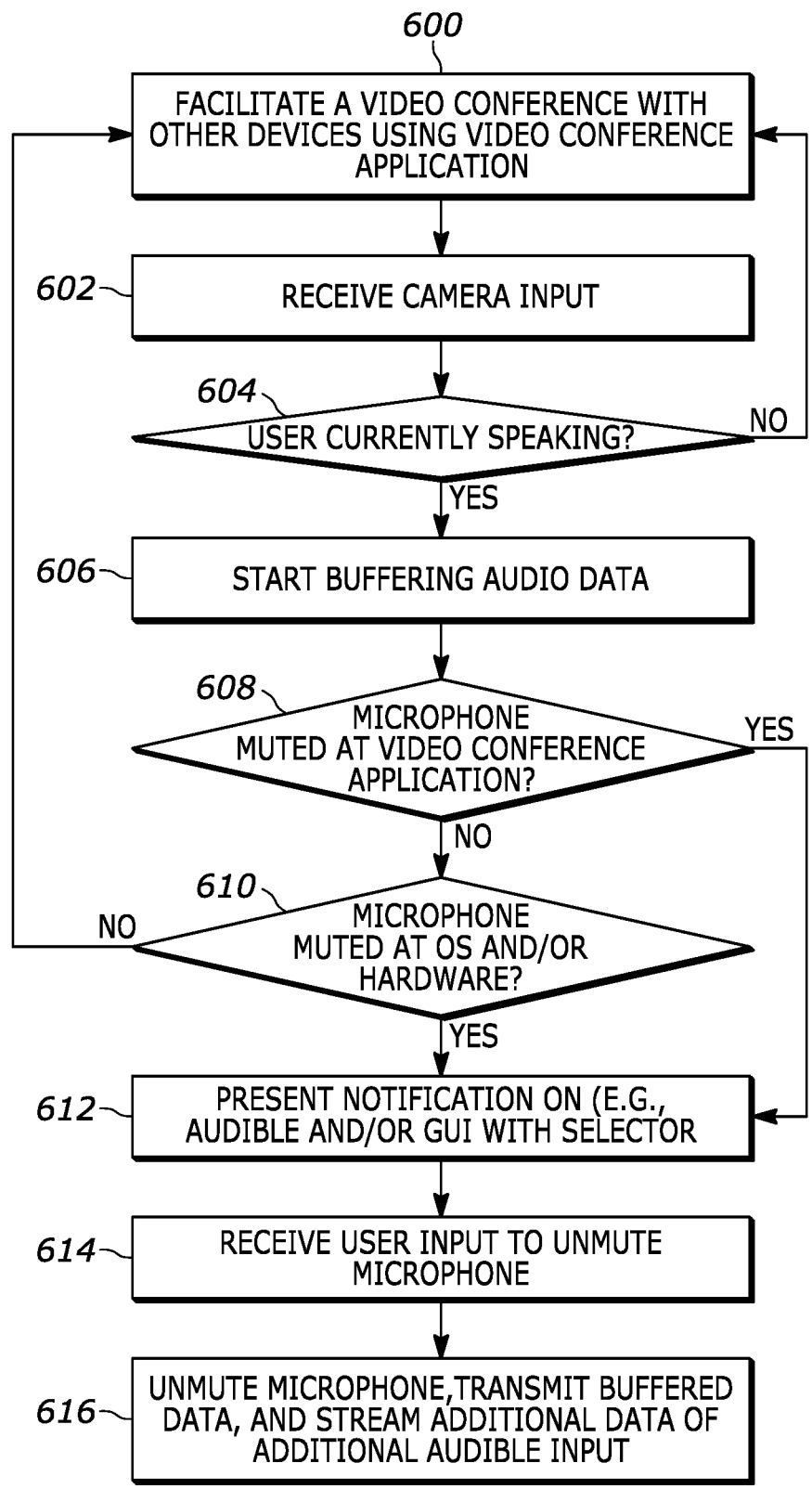
FIGS. 6 and 9 show flow charts of example algorithms consistent with present principles.

Now referring to FIG. 6, it shows example logic that may be executed by a device such as the device 304 and/or the system 100 consistent with present principles. However, also note that in some examples some or all of the logic steps of FIG. 6 may be performed by a remotely-located server in communication with the device, such as the same server that might be used to replay audio/video communications between participants of a video conference consistent with present principles.

Beginning at block 600, the device may facilitate a video conference with other devices, e.g., using a video conferencing application. For example, the device may launch the video conferencing application and/or initiate the video conference itself so that respective audible input and camera video from respective participant devices may be transmitted to the other participants in real time. From block 600 the logic may proceed to block 602.

At block 602 the device may receive input from a camera in communication with the device, such as its built-in webcam. The logic may then proceed to decision diamond 604 where the device may determine whether a user (such as the user 302) is currently speaking as indicated in the input from the camera. To make the determination at diamond 604, the device may execute a computer vision algorithm, for example. The computer vision algorithm may include, for example, a lip reading or movement algorithm, a gesture recognition algorithm, a facial recognition algorithm, etc. Additionally, note that in some examples the computer vision algorithm may make use of one or more artificial neural networks of an artificial intelligence model that may be used to determine whether the user is currently speaking based on the input from the camera. Example architecture for such a model will be described below in reference to FIG. 7.

If the device makes a negative determination at diamond 604, the logic may revert back to block 600 and proceed therefrom. However, if the device makes an affirmative determination at diamond 604, the logic may instead proceed to block 606 (or in some examples, directly to decision diamond 608). At block 606 the device may begin buffering or caching spoken input to the device's microphone as described above. From there the logic may proceed to decision diamond 608.

At diamond 608 the device may determine whether the microphone is currently muted via a mute mode controlled by the video conferencing application itself so that audio detected by the microphone is not provided to conference participants even if it is buffered/cached locally at the device (e.g., software mute rather than turning the microphone off). An affirmative determination at diamond 608 may cause the logic to proceed to block 612, which will be described shortly. However, first note that a negative determination at diamond 608 may instead cause the logic to proceed to decision diamond 610.

At diamond 610 the device may determine whether the microphone is currently muted via an operating system executing at the device itself (e.g., the device 304) and/or currently muted via hardware accessible to the device (e.g., muted via the button or switch 314, or the microphone being turned off/powered down altogether). The operating system may be, for example, the device's basic input/output system (BIOS) or a guest operating system such as Microsoft's Windows, Apple's Mac OS, Linux, etc. Thus, for example, the determination at diamond 610 may include whether the microphone has been muted or a mute mode entered via a "global" microphone mute command from the user to the operating system itself (rather than to the video conferencing application specifically) so that the microphone is muted for all functions that might be executed by the operating system using the microphone independent of the video conference itself.

A negative determination at diamond 610 may cause the logic to revert back to block 600 where the device may continue facilitating the video conference and transmit data indicating the audible input from the user to the microphone to other conference participants consistent with present principles owing to the microphone being determined to not be muted on any of the levels discussed above (e.g., application level, operating system level, or via hardware).

However, note that an affirmative determination at diamond 610 may instead cause the logic to proceed to block 612. At block 612 the device may present a notification at user's device indicating that the microphone is currently muted. For example, at block 612 the device may present an audible notification such as the example notification 320 described above and/or a visual notification such as the example notification 322/GUI 400 described above. Note that if block 612 is executed by a server rather than the end-user's device, the server may transmit a command to the end-user device to present the notification at the end-user device, whereas if the end-user device itself were executing block 612 it may simply control its display and/or speaker(s) to present the visual and/or audible notification, respectively.

From block 612 the logic may then proceed to block 614. At block 614 the device may, subsequent to presentation of the notification(s) at block 612, receive user input to unmute the microphone via the video conferencing application, the operating system, and/or the hardware. For example, the user input to unmute the microphone may be received based on selection of selector 404 or based on manipulation of the button or switch 314 to place the microphone in an unmuted mode.

From block 614 the logic may then proceed to block 616 where, responsive to receipt of the user input at block 614, the device may unmute the microphone. Also at block 614, the device may transmit, to the devices of the other conference participants, buffered or cached microphone data indicating audible input that was provided prior to the unmuting at block 614 consistent with the description above. Additionally or alternatively but also at block 614, the device may transmit additional microphone data to the devices of the respective conference participants that indicates additional audible input provided by the user after the unmuting at block 614. After block 614 the device may receive user input to mute the microphone again, and/or if desired after block 616 the logic may revert back to block 600 and proceed therefrom.

Figure 7:
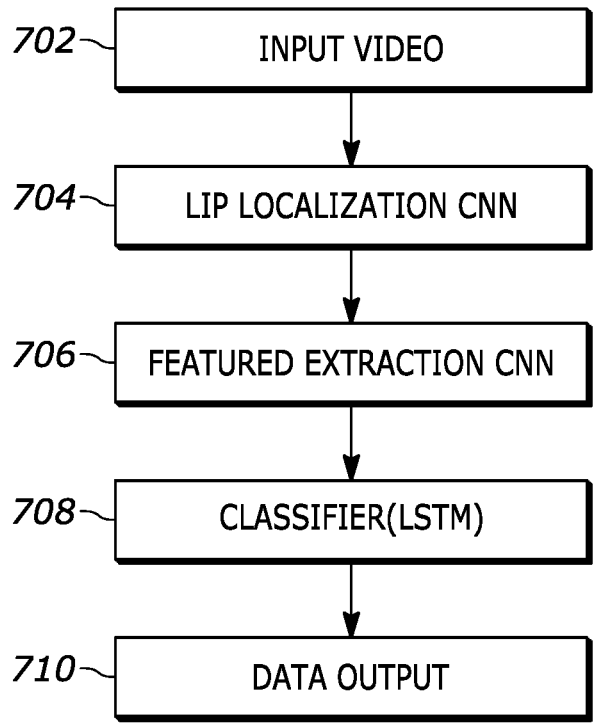
FIG. 7 shows example artificial intelligence architecture that may be used consistent with present principles.

Now describing FIG. 7, it shows a block diagram of example architecture for an artificial intelligence (AI) model 700 that may be used consistent with present principles to determine, based on camera input, whether a user is currently speaking. For example, the AI model 700 may be used as part of the computer vision executed to make the determination of diamond 604 described above. Thus, the AI model 700 may be maintained in the end-user's device and/or a server in communication therewith.

As shown in FIG. 7, input video or images 702 from a camera may be input into an input layer of a lip localization neural network, which may be established by a convolutional neural network (CNN) having the input layer, an output layer, and multiple hidden layers between the input and output layers. The lip localization neural network may thus take the input video 702 as input and identify the location of lips of the mouth of a user as output from the output layer of the lip localization neural network.

The output from the output layer of the lip localization neural network may then be provided as input to an input layer of a feature extraction neural network, which may also be established by a CNN with its own input layer, output layer, and multiple hidden layers between its input and output layers. The feature extraction neural network may thus take, as input, the output from the output layer of the lip localization neural network and identify features of the lips of the user at various times as output from the output layer for the feature extraction neural network.

The output from the output layer of the feature extraction neural network may then be provided as input to an input layer of a classifier 708 that may be established at least in part by one or more long short-term memory (LSTM) recurrent neural networks (RNNs) that may have their own respective input layers, an output layers, and multiple hidden layers therebetween. The classifier may then use the input to its input layer to determine whether the user's lips are currently moving (e.g., in motion(s) that appear like speech) and then output the classification as data output 710 (e.g., moving or not moving, or speaking or not speaking specifically). The data output 710 may then be used by the device undertaking the logic of FIG. 6 to determine whether the is currently speaking at diamond 604 based on whether the user's lips are moving (currently speaking) or not moving (not currently speaking), or to determine whether the is currently speaking at diamond 604 based on the output 710 itself if the classification that is output is specifically speaking or not speaking.

Figure 8:
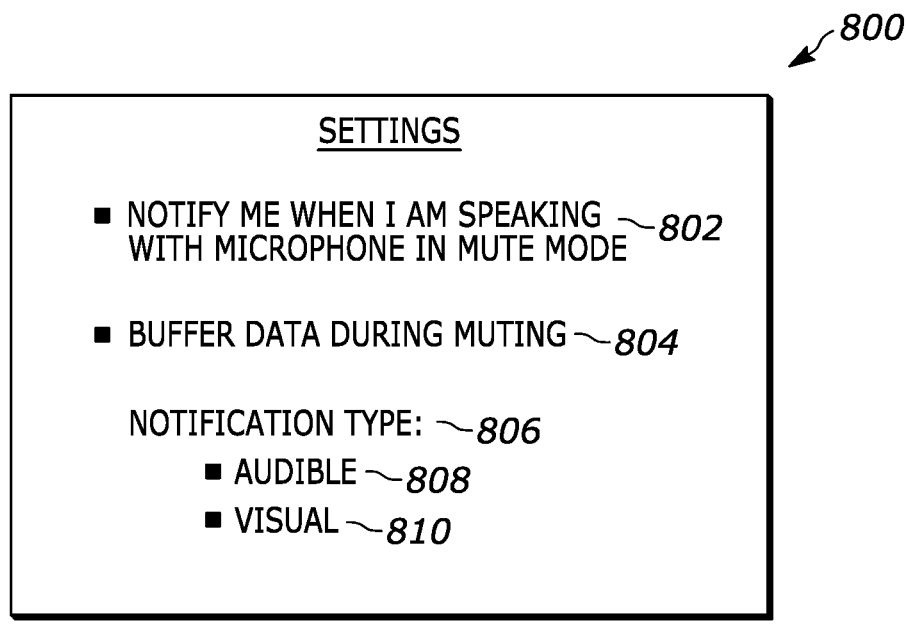
FIG. 8 shows an example GUI for configuring one or more settings of a device to undertake present principles.

Now describing FIG. 8, it shows an example graphical user interface (GUI) 800 that may be presented on the display of a end-user's device to configure one or more settings of the device to operate consistent with present principles. For example, the GUI 800 may be presented on the display 315 of the device 304 to configure one or more settings of the device related to microphone unmuting as described herein. Each of the options that will be described below may be selected by selecting the check box shown adjacent to the respective option through touch input, cursor input, etc.

As shown, the GUI 800 may include a first option 802 that may be selectable to enable the device to undertake present principles. For example, the option 802 may be selected to enable a setting for the device notify a user when the user is identified as currently speaking but with the microphone currently muted.

Additionally or alternatively, the option 802 may be selected to configure the device to undertake the other functions described above in reference to FIGS. 3-5, to execute the logic of FIG. 6, and/or to use the AI model 700 as described herein. For example, the option 802 may be selected to enable the device to perform automatic microphone unmuting responsive to determining that the user is currently speaking.

The GUI 800 may also include an option 804 that may be selectable to enable the device to buffer or cache audible input at the device that might be received while the microphone is muted or in its mute mode as described herein. Still further, the GUI 800 may include a setting 806 with various associated options 808, 810 that may be respectively selectable to present notifications audibly at the device (option 808) and/or visually at the device (option 810) as described herein.

Figure 9:
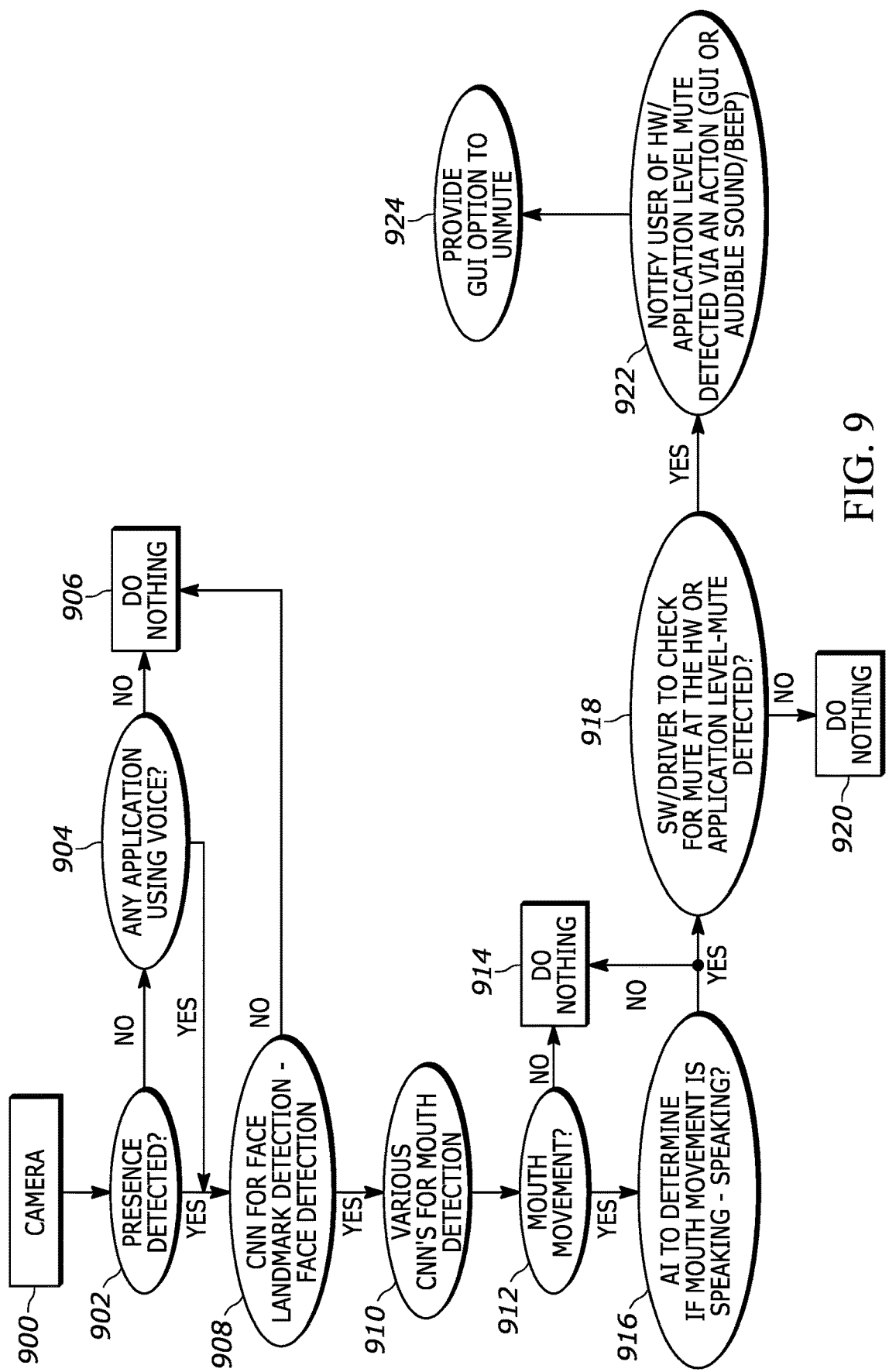

Moving on to FIG. 9, it shows example logic that may be executed by a device consistent with present principles either independently or in conjunction with the overall logic of FIG. 6 described above. As shown, input from a camera 900 may be used at oval 902 to determine whether a user's presence has been detected. Responsive to a negative determination at oval 902, the logic may proceed to oval 904 where the device may determine whether any application is using voice input from a microphone. Responsive to a negative determination at oval 904, the logic may proceed to block 906 where the logic may end.

However, responsive to an affirmative determination at either of oval 902 or oval 904, the logic may instead proceed to oval 908. At oval 908 a CNN for face landmark detection may be used to determine whether a user's face has been detected. Responsive to a negative determination at oval 908, the logic may revert back to block 906 as described above. However, responsive to an affirmative determination at oval 908, the logic may instead proceed to oval 910.

At oval 910 various CNNs for mouth detection may be employed to then determine at oval 912 whether mouth movement has been detected. Responsive to a negative determination at oval 912, the logic may proceed to block 914 where the logic may end. However, responsive to an affirmative determination at oval 912, the logic may instead proceed to oval 916 where the logic may employ an artificial intelligence model to determine if mouth movement is indicative of the user actually speaking (e.g., as opposed to merely licking his or her lips, simply opening his or her mouth, etc.).

A negative determination at oval 916 may cause the logic to proceed to block 914 as described above. However, an affirmative determination at oval 916 may instead cause the logic to proceed to oval 918 where software and/or a driver may be used to check for whether microphone input has been muted at the hardware or application level. A negative determination at oval 918 may cause the logic to proceed to block 920 where the logic may end. However, an affirmative determination at oval 918 may instead cause the logic to proceed to oval 922.

At oval 922 the user may be notified of the hardware and/or application level mute that is detected via a device action such as presentation of a GUI (e.g., the GUI 400 of FIG. 4) and/or such as presentation of an audible sound or beep (or even an automated voice as illustrated by the speech bubble 320 of FIG. 3). From oval 922 the logic may then proceed to oval 924 where a GUI option to unmute the microphone may be presented, such as presenting the selector 404 of FIG. 4 described above.

Figure 10:
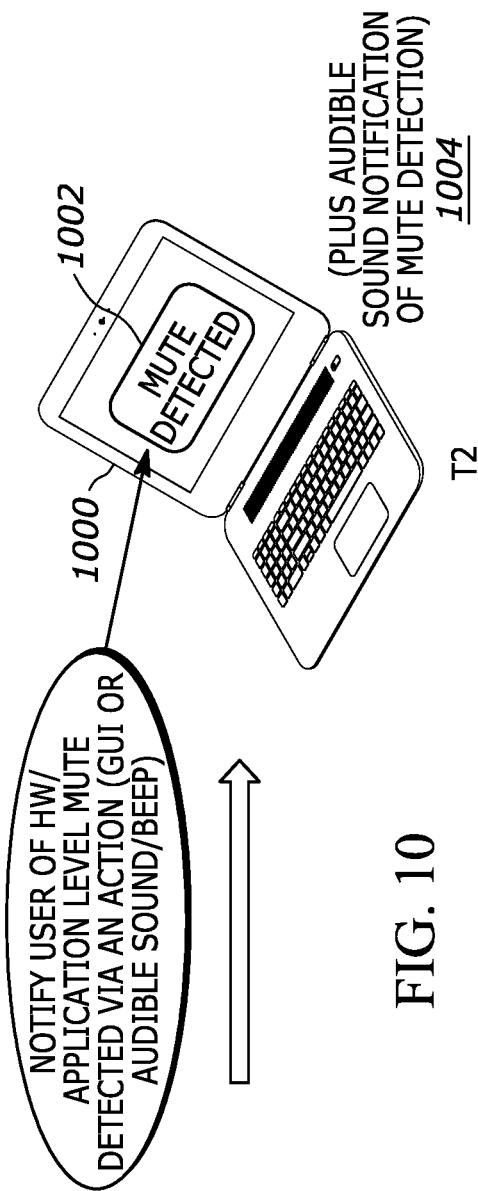
Figure 10:
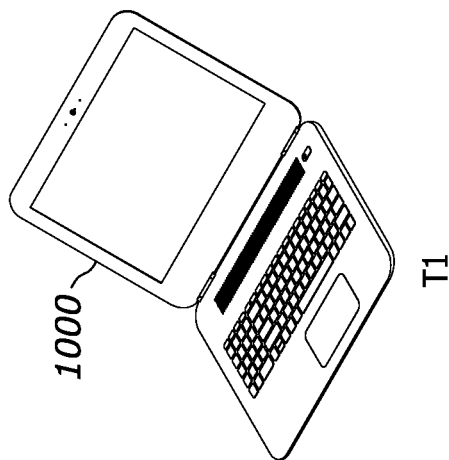

Now describing FIG. 10, it illustrates a laptop computer 1000 operating consistent with present principles. As shown, at a first time T1 the laptop 1000 determines that a user is speaking but that a hardware and/or application level microphone mute has been detected. Thus, at a later time T2 the user may be notified via presentation of a GUI and/or predetermined audible beep or sound at the laptop 1000 that the microphone mute has been detected. One such way to do so is via the visual notification box 1002 as presented on the laptop's display and/or via presentation of an audible sound notification 1004 via its speaker(s). Also note that the notification box 1002 may be presented or overlaid on top of the active call/conference user interface responsive to the microphone mute being detected.

Figure 11:
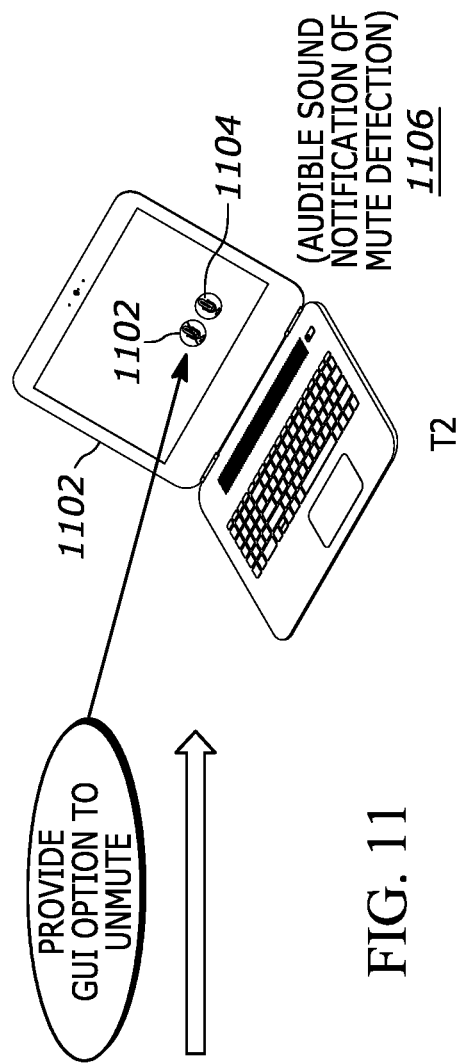
Figure 11:
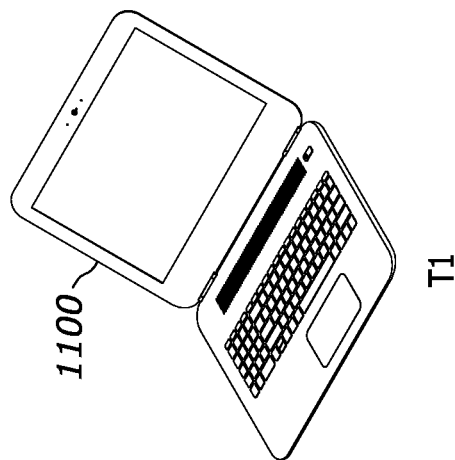

FIG. 11 illustrates another example of a laptop computer 1100 operating consistent with present principles. As shown, at a first time T1 the laptop 1100 determines that a user is speaking but that a hardware and/or application level microphone mute has been detected. Thus, at a later time T2 the user may be notified via a GUI presented toward the bottom of the laptop's display and/or via a predetermined audible beep or sound that the microphone mute has been detected. One such way to do so is by presenting the icons 1102, 1104 on the laptop's display, which themselves may act as a microphone status notification. The icons 1102, 1104 may also establish respective selectors that are respectively selectable to unmute (icon 1102) or mute (icon 1104) the microphone. As also shown in FIG. 11, at time T2 the laptop 1100 may also present an audible sound notification 1106 via its speaker(s).

Figure 12:
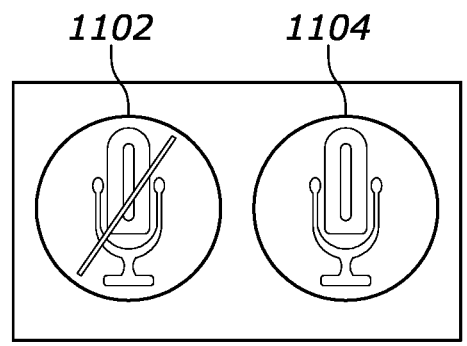
FIGS. 12 and 13 show example notifications that may be presented based on determining that a user is speaking consistent with present principles.
Figure 13:
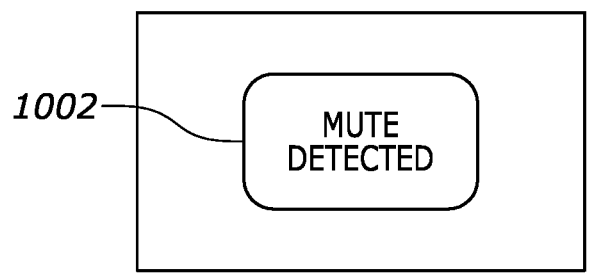

Note that the icons 1102 and 1104 are shown in FIG. 12 for further illustration. Also note that the visual notification box 1002 is shown in FIG. 13 for further illustration.

Before concluding, note that in some examples a device operating consistent with present principles may automatically unmute a microphone as described herein responsive to determining that a user's mouth is currently moving, e.g., rather than presenting a notification (such as the GUI 400) that the microphone is currently muted without automatically taking the microphone off mute mode. In these examples, based on the automatic unmuting, the device may present a different audible or visual indication that indicates that the microphone has been automatically unmuted so that the user may be made aware. For example, the device may present a GUI with text indicating the following: "Note: Your microphone has been unmuted so that conference participants can hear you."

Also before concluding, it is to be understood that present principles may be applied in implementations other than video conferencing. For example, present principles may be applied for voice-only calls, audio-video recording, voice recognition to command a digital assistant, audible input to transcribe a text message to be sent to another person, etc.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor; and
   storage accessible to the at least one processor and comprising instructions executable by the at least one processor to:
   receive input from a camera in communication with the at least one processor;
   determine, based on the input from the camera, whether a user is currently speaking;
   responsive to a determination that the user is currently speaking, present a notification regarding whether to unmute at least one microphone accessible to the at least one processor;
   while the at least one microphone is muted, buffer input to the at least one microphone of the user speaking; and
   responsive to the at least one microphone being unmuted, transmit the buffered input to a second device different from the first device.

2. The first device of claim 1, wherein the instructions are executable to:
   prior to presentation of the notification, determine whether the at least one microphone is currently muted; and responsive to both the determination that the user is currently speaking and a determination that the at least one microphone is currently muted, present the notification.

3. The first device of claim 2, wherein the instructions are executable to:
facilitate, using a first video conferencing application, a video conference with a second device different from the first device; and
determine whether the at least one microphone is currently muted via the first video conferencing application.

4. The first device of claim 3, wherein the instructions are executable to:
based on a determination that the at least one microphone is not currently muted via the first video conferencing application, determine whether the at least one microphone is currently muted via one or more of: an operating system executing at the first device, hardware accessible to the first device.

5. The first device of claim 4, wherein the hardware comprises a switch or button that is manipulable to mute and unmute the at least one microphone.

6. The first device of claim 1, wherein the instructions are executable to:
determine, at a first time and based on input from the camera, that the user's mouth is moving in a way indicative of the user as not currently speaking;
responsive to the determination that the user's mouth is moving in a way indicative of the user as not currently speaking, decline to present the notification;
determine, at a second time and based on input from the camera, that the user's mouth is moving in a way indicative of the user as currently speaking; and
responsive to the determination that the user's mouth is moving in a way indicative of the user as currently speaking, present the notification.

7. The first device of claim 1, wherein the notification is a first notification, wherein the input of the user speaking is first input of the user speaking, and wherein the instructions are executable to:
responsive to the at least one microphone being unmuted, transmit the buffered first input to the second device and also present a second notification, the second notification being different from the first notification, the second notification indicating that the at least one microphone has been unmuted, the second notification further indicating that the user should wait before providing additional input to that at least one microphone beyond the first input.

8. A method, comprising:
receiving input from a camera;
determining, based on the input from the camera, whether a user is currently speaking;
responsive to determining that the user is currently speaking, issuing a command to present a notification regarding whether to unmute at least one microphone accessible to a first device;
while the at least one microphone is muted, buffering input of the user speaking; and
responsive to the at least one microphone being unmuted, transmitting the buffered input to a second device different from the first device.

9. The method of claim 8, wherein the input of the user speaking is buffered at the first device.

10. The method of claim 8, wherein the input of the user speaking is buffered at the server.

11. The method of claim 8, comprising:
determining, at a first time and based on input from the camera, that the user's mouth is moving in a way indicative of the user as not currently speaking;
responsive to determining that the user's mouth is moving in a way indicative of the user as not currently speaking, declining to issue the command to present the notification;
determining, at a second time and based on input from the camera, that the user's mouth is moving in a way indicative of the user as currently speaking; and
responsive to determining that the user's mouth is moving in a way indicative of the user as currently speaking, issuing the command to present the notification.

12. At least one computer readable storage medium (CRSM) that is not a transitory signal, the computer readable storage medium comprising instructions executable by at least one processor to:
receive input from a camera in communication with the at least one processor;
determine, based on the input from the camera, that a user is speaking;
based on the determination that the user is speaking, present a graphical user interface (GUI) on a display accessible to the at least one processor, the GUI comprising an indication that at least one microphone accessible to the at least one processor is in a mute mode;
while the at least one microphone is in the mute mode, buffer input of the user speaking; and
responsive to the at least one microphone being taken out of the mute mode, transmit the buffered input from a first device to a second device different from the first device.

13. The CRSM of claim 12, wherein the at least one microphone is taken out of the mute mode to transmit the buffered input based on selection of a selector presented as part of the GUI.

14. The CRSM of claim 13, wherein the GUI is a first GUI, wherein the input of the user speaking is first input of the user speaking, and wherein the instructions are executable to:
responsive to the at least one microphone being taken out of the mute mode, transmit the buffered first input from the first device to the second device and also present a second GUI on the display, the second GUI being different from the first GUI, the second GUI indicating that the at least one microphone has been taken out of the mute mode, the second GUI further indicating that the user should wait before providing additional input to that at least one microphone beyond the first input.

15. The CRSM of claim 12, wherein the instructions are executable to:
while the at least one microphone is in the mute mode, buffer a threshold most-recent amount of the user speaking in random-access memory (RAM).

16. The CRSM of claim 15, wherein the RAM is located on the first device.

17. The CRSM of claim 12, wherein the buffered input is not transmitted to the second device until the at least one microphone is taken out of the mute mode.

18. The CRSM of claim 12, wherein the GUI further comprises an indication that the input of the user speaking is being buffered.

19. The CRSM of claim 12, wherein the GUI is a first GUI, and wherein the instructions are executable to:

present a second GUI on the display, the second GUI being different from the first GUI, the second GUI being usable to configure one or more settings of the first device, the second GUI comprising at least a first option that is selectable to enable the first device to in the future buffer audible input to the at least one microphone while the at least one microphone is in the mute mode.

20. The CRSM of claim 12, wherein the instructions are executable to:
   determine, at a first time and based on input from the camera, that the user's mouth is moving in a way indicative of the user as not currently speaking;
   responsive to the determination that the user's mouth is moving in a way indicative of the user as not currently speaking, decline to present the GUI;
   determine, at a second time and based on input from the camera, that the user's mouth is moving in a way indicative of the user as currently speaking; and
   responsive to the determination that the user's mouth is moving in a way indicative of the user as currently speaking, present the GUI.

* * * * *